Patented June 1, 1954

2,680,130

UNITED STATES PATENT OFFICE 2,680,130

METHOD OF PRODUCING ORGANIC DIISOCYANATES

Hector Flores, Anniston, Ala., assignor to Monsanto Chemical Company, St. Louis, Mo., a corporation of Delaware No Drawing. Application January 2, 1952,
Serial No. 264,692

15 Claims. (Cl. 260—453)

This invention relates to a novel method of producing alkyl, cycloalkyl, alkaryl, aralkyl, aryl and hydroaryl diisocyanates.

Heretofore, alkyl, cycloalkyl, alkaryl, aralkyl and hydroaryl diisocyanates have been prepared by reacting phosgene with the corresponding primary amines in the presence of relatively low boiling inert organic solvents to form an intermediate reaction product which is then treated with additional quantities of phosgene to form the corresponding diisocyanate. The crude product thus obtained is then treated with an inert gas such as nitrogen, methane, natural gas, etc. to remove unreacted phosgene and hydrogen chloride, whereupon the degassed product is distilled to separate the solvent from the diisocyanate.

As a modification of the above method, the above diisocyanates have been prepared by first forming the primary amine dihydrochloride salt, slurrying the salt in a relatively low boiling inert organic solvent and then treating the slurry with phosgene to convert it into a crude solution of the corresponding diisocyanate. This solution is then treated in the manner indicated in the preceding paragraph to degas same and separate the solvent from the diisocyanate product.

The above methods have enjoyed substantial commercial success, but they are subject to the disadvantage of producing excessive amounts of polymers and other undesirable by-products which substantially reduce the yield of the desired diisocyanate. Moreover, this reduction in yield of the diisocyanate is further enhanced by polymerizaton which occurs when the above solvents are distilled from the crude isocyanate solution. Furthermore, the above methods have the disadvantage of producing a hard residue containing entrapped diisocyanate, which is difficultly removable from the reactor. Finally, the above methods require excessively large amounts of phosgene in order to obtain optimum conversions.

It is an object of the instant invention to overcome the above disadvantages and to provide a new method which permits the production of the above organic diisocyanates in an easy and economical manner.

In accordance with the present invention, phosgene and a primary diamine are reacted together in the presence of the hereinafter described high boiling partially hydrogenated aromatic hydrocarbon solvent to form an intermediate reaction product containing the corresponding amine hydrochloride, which is then treated with additional quantities of phosgene to convert same into a solution of the corresponding diisocyanate. As an alternative to the foregoing two-step method, there may be employed the single step method of directly producing the diisocyanate by reacting the corresponding primary amine dihydrochloride with phosgene in the presence of the above-mentioned inert high boiling organic solvent. In either case, the resulting crude solution of diisocyanate, with or without degassing treatment to remove hydrogen chloride and unreacted phosgene, is subjected to fractional distillation to separate substantially pure diisocyanate as a distillate.

Broadly stated, the present invention comprises reacting phosgene with a primary amine or a hydrochloride of a primary diamine selected from the class consisting of alkyl, cycloalkyl, alkaryl, aralkyl, aryl and hydroaryl amines, the reaction being carried out in the presence of the above-mentioned inert high boiling aromatic hydrocarbon solvent. The primary amine hydrochloride used in this reaction may be produced by reacting, in the presence of the above solvent, the corresponding amine with a compound selected from the class consisting of phosgene and hydrogen chloride.

More specifically, the instant invention comprises reacting a primary amine of the above type with phosgene in the presence of the above-mentioned inert high boiling aromatic hydrocarbon solvent to produce an intermediate reaction product containing the corresponding hydrochloride and then treating the foregoing reaction product with further quantities of phosgene to convert it into the corresponding diisocyanate.

Still more specifically, the instant invention comprises the foregoing methods of producing organic diisocyanates, which include additional steps of degassing and/or fractionally distilling the resulting solution to recover the diisocyanate in a substantially pure form.

The instant invention is illustrated but not limited by the following specific examples.

EXAMPLE I

Meta-tolylene diisocyanate

A phosgene solution was produced by bubbling phosgene at the rate of 700 c. c. per minute into 188 parts of cooled stirred ortho-dichlorobenzene for a period of about 26 minutes, and to this product a solution of 50 parts of meta-tolylene diamine in 188 parts of the above chlorinated solvent was introduced. The introduction of the meta-tolylene diamine solution was executed in a period of about 15 minutes, and during this time the ensuing reaction took place at a temperature below about 40° C. to produce a slurry of an intermediate reaction product.

As soon as the foregoing reaction had been completed, the slurry of intermediate reaction product was heated to about 150° C. to about 165° C. and treated with phosgene for 220 minutes to convert the above slurry into a crude solution of meta-tolylene diisocyanate, the phosgene being supplied to the slurry at an average rate of about 80 c. c. per minute.

The crude solution of meta-tolylene diisocyanate obtained in the above described manner was heated to a temperature of about 165° C. to about 170° C. and treated for 30 minutes with dry natural gas to remove hydrogen chloride and unreacted phosgene. The degassed product contained meta-tolylene diisocyanate in a yield corresponding to about 70% of theory, basis meta-tolylene diamine.

EXAMPLE II

Meta-tolylene diisocyanate

A phosgene solution was prepared at room temperature from 36000 c. c. (1.44 mole) of phosgene and 376 grams of a partially hydrogenated aromatic hydrocarbon liquid mixture characterized by having a specific gravity of about 1.004 at 25° C., a refractive index of about 1.5600 at 25° C. and a boiling range of 340° C. to 390° C. at atmospheric pressure, and obtained by the method disclosed in Patent 2,364,719 to Russell L. Jenkins. To the above solution which was cooled to 0° C., there was added a hot solution prepared at 95° C. from 976 grams of the above partially hydrogenated liquid aromatic hydrocarbon mixture and 90 grams of meta-tolylene diamine. This resulted in the production of a slurry of an intermediate reaction product containing the corresponding amine hydrochloride.

The slurry thus obtained was heated to a temperature of 190° C. to 200° C. and treated with phosgene at the rate of one mole per hour until it was converted into a clear crude solution of meta-tolylene diisocyanate.

The crude solution of meta-tolylene diisocyanate was degassed at a temperature of 185° C. to 195° C. by bubbling nitrogen therethrough for forty-five minutes. The degassed solution was analyzed and found to contain 95.5% of theory of meta-tolylene diisocyanate, basis meta-tolylene diamine.

The above experimental data clearly demonstrate that markedly improved yields of crude organic diisocyanates are obtained by the high boiling solvent method of the instant invention. This is important because the crude material can frequently be used directly as an intermediate in the production of other products and also because it contributes to an increase in the final yield of the substantially pure diisocyanate.

The experimental data hereinbefore submitted clearly show that the high boiling solvent method produces surprising results since the use of higher temperatures in the reaction step would normally be expected to enhance the degree of polymerization of the isocyanates and thereby decrease the yield of diisocyanate.

The method of the instant invention is applicable to the production of alkyl, cycloalkyl, alkaryl, aralkyl, aryl and hydroaryl diisocyanates. Illustrative examples of these are octamethylene diisocyanate, undecamethylene diisocyanate, dodecamethylene diisocyanate, 3,3' diisocyanato dipropyl ether, etc.; cyclopentylene-1,3 diisocyanate, cyclohexylene-1,4 diisocyanate, etc.; xylylene 1,4 diisocyanate, xylylene 1,3-diisocyanate, 4,4' diphenylmethane diisocyanate, etc., α,α'-xylene diisocyanate-1,3; α,α'-xylene diisocyanate-1,4; o-, m- and p-tolylene diisocyanate, 1-methyl phenylene-2,4-diisocyanate, naphthalene 1,4-diisocyanate, etc.; and 1,2,3,4-tetrahydronaphthalene-5,8-diisocyanate, 1,2,3,4-tetrahydro-6-chloronaphthalene-5,8-diisocyanate.

In the production of organic diisocyanates in accordance with the instant invention, phosgene and a primary diamine are reacted together in the presence of the above-mentioned inert high boiling partially hydrogenated aromatic hydrocarbon solvent to form an intermediate reaction product containing the corresponding hydrochloride. This reaction is effected at a temperature substantially in the range of about $-20°$ C. to about 60° C. and within these limits a temperature of about 30° C. to about 50° C. is preferred.

The intermediate reaction product obtained in the foregoing manner is then reacted with phosgene in the presence of the above solvent to convert it into the corresponding diisocyanate. This reaction is effected at a temperature substantially in the range of about 80° C. to about 250° C. and within this range a temperature of about 130° C. to about 200° C. is preferred.

In executing the above reactions, the reactants are reacted together in the proportions calculated to provide an overall phosgene/amine molecular ratio of about 2.2 or higher. This means that if in the primary reaction a molar ratio of less than 1 is used, sufficient phosgene is added in the secondary reaction step to bring the final phosgene/amine molar ratio up to the above value. Larger or smaller overall phosgene/amine molar ratios are also within the scope of the invention, but when smaller ratios are employed, the theoretical requirements at least should be substantially met.

The reaction between phosgene and the slurry or solution of primary amine hydrochloride in an inert high boiling partially hydrogenated aromatic hydrocarbon solvent is executed at a temperature substantially in the range of about 80° C. to about 250° C. or more specifically in the range of about 120° C. to about 250° C. and within these limits a temperature of about 150° C. to about 200° C. is preferred.

The above reactants are employed in a phosgene/amine hydrochloride molar ratio of about 2.2. Larger or smaller molar ratios are also within the scope of the invention, but when using smaller ratios the theoretical requirements at least should be substantially met.

It is desired to point out that in each of the modifications of applicant's invention hereinbefore described, the degassing step is optional and may be omitted if desired.

The inert high boiling partially hydrogenated aromatic hydrocarbon solvent referred to above is a partially hydrogenated aromatic hydrocarbon liquid mixture, characterized by having a specific gravity within the range of 0.955 to 1.05 at 25° C. This product is obtained by the partial catalytic hydrogenation of the mixture of normally solid aromatic hydrocarbons boiling above about 340° C. at 760 mm. pressure. For a more detailed description of its properties and method of preparation, reference is made to Patent 2,364,719 which is incorporated by reference and made a part of the instant specification.

In contrast to the above high boiling solvents, the low boiling solvents of the prior art have boiling points which do not exceed 255° C. at atmospheric pressure. Typical examples of these are benzene, chlorobenzene, dichlorobenzene, toluene, xylene, nitrobenzene, cyclohexane, kerosene, carbon tetrachloride, tetrachloroethylene, trichloroethylene, tetrachloroethane, trichlorobenzene, decahydronaphthalene, tetrahydronaphthalene, amylbenzene, p-cymene, o-cymene, m-cymene, n-dodecylbenzene, naphthalene, n-heptylcyclopentane and biphenyl.

The above description and examples are intended to be illustrative only. Any modification or variation therefrom which conforms to the spirit of the invention is intended to be included within the scope of the claims.

What I claim is:

1. The method of producing organic diisocyanates, which comprises reacting phosgene with the hydrochlorides of primary amines selected from the class consisting of alkyl, cycloalkyl, alkaryl, aralkyl, aryl and hydroaryl diamines, said reaction being carried out at a temperature in the range of about 80° C. to about 250° C. and in the presence of a partially hydrogenated aromatic hydrocarbon liquid mixture, characterized by having a specific gravity within the range of 0.950 and 1.05 at 25° C. and obtained by the partial catalytic hydrogenation of the mixture of normally solid aromatic hydrocarbons boiling above about 340° C. at 760 mm. pressure and formed in the synthesis of biphenyl by the pyrolysis of benzene at elevated temperatures.

2. The method of producing organic diisocyanates in accordance with claim 1, wherein the primary amine hydrochlorides are produced by reacting the corresponding amines with a compound selected from the group consisting of phosgene and hydrogen chloride.

3. The method of producing organic diisocyanates in accordance with claim 2, which includes the additional step of degassing the resulting solution of organic diisocyanate.

4. The method of producing organic diisocyanates in accordance with claim 3, which includes the additional step of recovering the organic diisocyanate from the resulting solution of said product.

5. The method of producing organic diisocyanates, which comprises reacting phosgene with the hydrochlorides of primary amines selected from the class consisting of alkyl, cycloalkyl, alkaryl, aralkyl, aryl and hydroaryl diamines, said reaction being carried out at a temperature in the range of about 80° C. to about 250° C. and in the presence of a partially hydrogenated aromatic hydrocarbon liquid mixture, characterized by having a specific gravity within the range of 0.970 and 0.995 at 25° C. and obtained by the partial catalytic hydrogenation of the mixture of normally solid aromatic hydrocarbons boiling above about 370° C. at 760 mm. pressure and formed in the synthesis of biphenyl by the pyrolysis of benzene at elevated temperatures.

6. The method of producing organic diisocyanates, which comprises reacting phosgene with the hydrochlorides of primary amines selected from the class consisting of alkyl, cycloalkyl, alkaryl, aralkyl, aryl and hydroaryl diamines, said reaction being carried out at a temperature in the range of about 80° C. to about 250° C. and in the presence of a partially hydrogenated aromatic hydrocarbon liquid mixture, characterized by having a specific gravity of 1.017 at 25° C. and obtained by the partial catalytic hydrogenation of the mixture of normally solid aromatic hydrocarbons boiling above about 340° C. at 760 mm. pressure and formed in the synthesis of biphenyl by the pyrolysis of benzene at elevated temperatures.

7. The method of producing organic diisocyanates, which comprises reacting phosgene with the hydrochlorides of primary amines selected from the class consisting of alkyl, cycloalkyl, alkaryl, aralkyl, aryl and hydroaryl diamines, said reaction being carried out at a temperature in the range of about 80° C. to about 250° C. and in the presence of a partially hydrogenated aromatic hydrocarbon liquid mixture, characterized by having a specific gravity of 0.951 at 25° C. and obtained by the partial catalytic hydrogenation of the mixture of normally solid aromatic hydrocarbons boiling above about 340° C. at 760 mm. pressure and formed in the synthesis of biphenyl by the pyrolysis of benzene at elevated temperatures.

8. The method of producing organic diisocyanates, which comprises reacting phosgene with the hydrochlorides of primary amines selected from the class consisting of alkyl, cycloalkyl, alkaryl, aralkyl, aryl and hydroaryl diamines, said reaction being carried out at a temperature in the range of about 80° C. to about 250° C. and in the presence of a partially hydrogenated aromatic hydrocarbon liquid mixture, characterized by having a specific gravity of 0.973 at 25° C. and obtained by the partial catalytic hydrogenation of the mixture of normally solid aromatic hydrocarbons boiling above about 340° C. at 760 mm. pressure and formed in the synthesis of biphenyl by the pyrolysis of benzene at elevated temperatures.

9. The method of producing organic diisocyanates which comprises reacting phosgene with the hydrochlorides of primary amines selected from the class consisting of alkyl, cycloalkyl, alkaryl, aralkyl, aryl and hydroaryl diamines, said reaction being carried out at a temperature in the range of about 80° C. to about 250° C. and in the presence of a partially hydrogenated aromatic hydrocarbon liquid mixture, characterized by having a specific gravity of 0.950 at 25° C. and obtained by the partial catalytic hydrogenation of the mixture of normally solid aromatic hydrocarbons boiling above about 340° C. at 760 mm. pressure and formed in the synthesis of biphenyl by the pyrolysis of benzene at elevated temperatures.

10. The method of producing organic diisocyanates, which comprises reacting phosgene with the hydrochlorides of primary amines selected from the class consisting of alkyl, cycloalkyl, alkaryl, aralkyl, aryl and hydroaryl diamines, said reaction being carried out at a temperature in the range of about 80° C. to about 250° C. and in the presence of a partially hydrogenated aromatic hydrocarbon liquid mixture, characterized by having a specific gravity of 0.9825 at 25° C. and obtained by the partial catalytic hydrogenation of the mixture of normally solid aromatic hydrocarbons boiling above about 340° C. at 760 mm. pressure and formed in the synthesis of biphenyl by the pyrolysis of benzene at elevated temperatures.

11. The method of producing meta-tolylene diisocyanate which comprises reacting phosgene with meta-tolylene diamine dihydrochloride in the presence of a partially hydrogenated aromatic hydrocarbon liquid mixture, characterized by having a specific gravity within the range of 0.950 and 1.05 at 25° C. and obtained by the partial catalytic hydrogenation of the mixture of normally solid aromatic hydrocarbons boiling above about 340° C. at 760 mm. pressure and formed in the synthesis of biphenyl by the pyrolysis of benzene at elevated temperatures said reaction being carried out at a temperature in the range of about 80° C. to about 250° C.

12. The method of producing meta-tolylene diisocyanate in accordance with claim 11, wherein the meta-tolylene diamine dihydrochloride is prepared by reacting the corresponding amine with a compound selected from the group consisting of phosgene and hydrogen chloride.

13. The method of producing organic diisocyanates, which comprises reacting together, at a temperature in the range of about −20° C. to about 60° C. and in the presence of an inert organic solvent, phosgene and a primary amine selected from the class consisting of alkyl, cycloalkyl, alkaryl, aralkyl, aryl and hydroaryl diamines to form an intermediate reaction product containing the corresponding amine hydrochloride and then reacting said reaction product with phosgene at a temperature in the range of about 80° C. to about 250° C. to convert it into the corresponding diisocyanate, said inert organic solvent being a partially hydrogenated aromatic hydrocarbon liquid mixture, characterized by having a specific gravity within the range of 0.950 and 1.05 at 25° C. and obtained by the partial catalytic hydrogenation of the mixture of normally solid aromatic hydrocarbons boiling above about 340° C. at 760 mm. pressure and formed in the synthesis of biphenyl by the pyrolysis of benzene at elevated temperatures.

14. The method of producing organic diisocyanates in accordance with claim 13, which includes the additional step of degassing the resulting solution of organic diisocyanate.

15. The method of producing organic diisocyanates in accordance with claim 14, which includes the additional step of recovering the organic diisocyanate from the resulting solution of said product.

References Cited in the file of this patent
UNITED STATES PATENTS

| Number | Name | Date |
| --- | --- | --- |
| 2,326,501 | Siefken at al. | Aug. 10 1943 |
| 2,374,340 | Farlow | Apr. 24, 1945 |